United States Patent
Maddhuri et al.

(10) Patent No.: US 8,352,611 B2
(45) Date of Patent: Jan. 8, 2013

(54) ALLOCATING COMPUTER RESOURCES IN A CLOUD ENVIRONMENT

(75) Inventors: Hari Haranath Maddhuri, Austin, TX (US); Sudhee Nagabhushan Subrahmanya, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 197 days.

(21) Appl. No.: 12/826,312

(22) Filed: Jun. 29, 2010

(65) Prior Publication Data

US 2011/0320606 A1    Dec. 29, 2011

(51) Int. Cl.
*G06F 15/173* (2006.01)
*G06F 15/16* (2006.01)

(52) U.S. Cl. ........ 709/226; 709/224; 709/206; 709/204; 709/203; 709/228; 705/2; 705/5; 718/100; 718/104; 718/105

(58) Field of Classification Search .................. 709/226, 709/228, 224, 203–206
See application file for complete search history.

(56) References Cited

U.S. PATENT DOCUMENTS

| | | | |
|---|---|---|---|
| 7,463,648 B1 | 12/2008 | Eppstein et al. | |
| 7,487,258 B2 | 2/2009 | Eilam et al. | |
| 7,620,706 B2 | 11/2009 | Jackson | |
| 7,689,490 B2 | 3/2010 | Hurewitz | |
| 7,793,297 B2 | 9/2010 | Aggarwal et al. | |
| 7,870,044 B2 | 1/2011 | Robertson | |
| 2005/0198641 A1 | 9/2005 | Eilam et al. | |
| 2005/0267824 A1* | 12/2005 | Hurewitz | 705/30 |
| 2006/0248372 A1 | 11/2006 | Aggarwal et al. | |
| 2007/0022425 A1 | 1/2007 | Jackson | |
| 2008/0080396 A1 | 4/2008 | Meijer et al. | |
| 2008/0082667 A1 | 4/2008 | Meijer et al. | |
| 2009/0299920 A1 | 12/2009 | Ferris et al. | |
| 2009/0300149 A1 | 12/2009 | Ferris et al. | |
| 2009/0300210 A1 | 12/2009 | Ferris | |
| 2009/0300607 A1 | 12/2009 | Ferris et al. | |
| 2010/0050172 A1 | 2/2010 | Ferris | |
| 2010/0057831 A1 | 3/2010 | Williamson | |
| 2010/0088205 A1 | 4/2010 | Robertson | |
| 2010/0131649 A1 | 5/2010 | Ferris | |
| 2010/0287199 A1* | 11/2010 | Fuhry et al. | 707/770 |

FOREIGN PATENT DOCUMENTS

WO    2009111799 A2    9/2009

OTHER PUBLICATIONS

Madduri et al., "Allocating Computer Resources in a Cloud Environment," U.S. Appl. No. 13/424,896, filed Mar. 20, 2012, 50 pages.

* cited by examiner

*Primary Examiner* — Jude Jean Gilles
(74) *Attorney, Agent, or Firm* — Yee & Associates, P.C.; Jeffrey S. LaBaw

(57) ABSTRACT

A method, data processing system, and computer program product for managing resources. A request for resources in the network data processing system is received. The request comprises requested values for a plurality of attributes for the resources in the network data processing system. In response to receiving the request, potential resources in the network data processing system are identified. The request is evaluated using a function configured to generate identified values for the plurality of attributes from the requested values in the request based on proximity scores for the plurality of attributes in the potential resources relative to an ideal allocation of the potential resources and resource weights for the plurality of attributes in the potential resources.

20 Claims, 10 Drawing Sheets

ALLOCATING COMPUTER RESOURCES IN A CLOUD ENVIRONMENT

BACKGROUND

1. Field

The present disclosure relates generally to an improved data processing system and, in particular, to a method and apparatus for allocating resources. Still more particularly, the present disclosure relates to a method and apparatus for allocating resources in network data processing systems.

2. Description of the Related Art

Organizations commonly use network data processing systems in manufacturing products, performing services, internal activities, and other suitable operations. Some organizations use network data processing systems in which the hardware and software are owned and maintained by the organization. These types of network data processing systems may take the form of local area networks, wide area networks, and other suitable forms. These types of networks place the burden of maintaining and managing the resources on the organization. In some cases, an organization may outsource the maintenance of a network data processing system.

Other organizations may use network data processing systems in which the hardware and software may be located and maintained by a third party. With this type of organization, the organization uses computer systems to access the network data processing system. With this type of architecture, the organization has less hardware to use and maintain.

This type of network data processing system also may be referred to as a cloud. With a cloud environment, the cloud is often accessed through the internet in which the organization uses computers or a simple network data processing system to access these resources. Further, with a cloud, the amount of resources provided to an organization may change dynamically. For example, as an organization needs more resources, the organization may request those resources.

As a result, organizations that use clouds do not own the hardware and software. Further, these organizations avoid capital expenditures and costs for maintenance of the computing resources. The organizations pay for the computer resources used. The organizations may be paid based on the resources actually used, such as actual processing time and storage space, or other use of resources. The organizations also may pay for fixed amounts of resources periodically. For example, an organization may pay for a selected amount of storage and processing power on a monthly basis. This usage is similar to resources, such as electricity or gas.

SUMMARY

In these illustrative embodiments, a method, data processing system, and computer program product is provided for managing resources. A request for resources in the network data processing system is received. The request comprises requested values for a plurality of attributes for the resources in the network data processing system. In response to receiving the request, potential resources in the network data processing system are identified. The request is evaluated using a function configured to generate identified values for the plurality of attributes from the requested values in the request based on proximity scores for the plurality of attributes in the potential resources relative to an ideal allocation of the potential resources and resource weights for the plurality of attributes in the potential resources.

DETAILED DESCRIPTION

Figure 1:
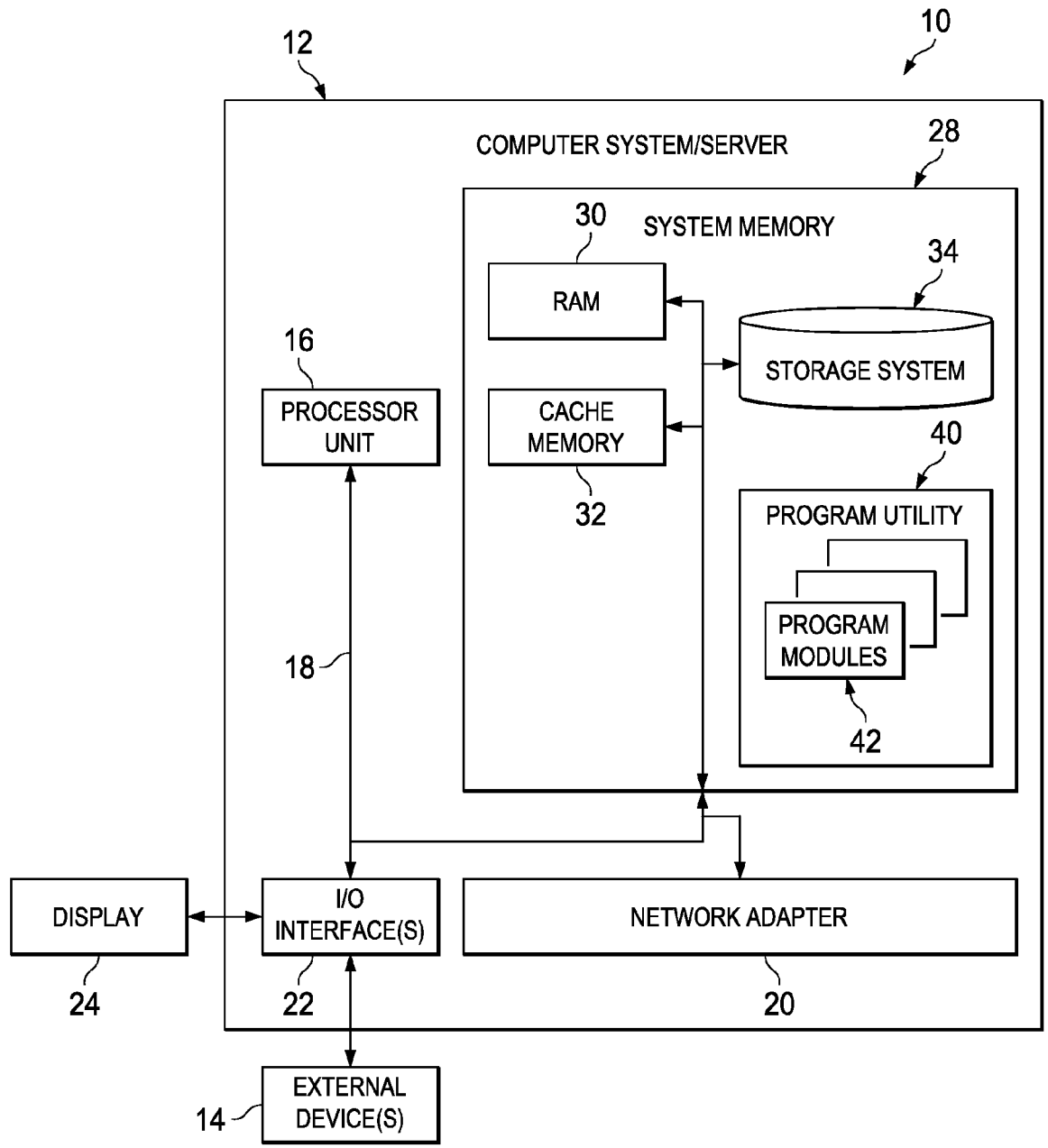
FIG. 1 depicts a cloud computing node according to an illustration of the present invention.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media, such as those supporting the Internet or an intranet, or a magnetic storage device.

Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

It is understood in advance that, although this disclosure includes a detailed description on cloud computing, implementation of the teachings recited herein are not limited to a cloud computing environment. Rather, embodiments of the present invention are capable of being implemented in conjunction with any other type of computing environment now known or later developed.

For convenience, the Detailed Description includes the following definitions which have been derived from the "Draft NIST Working Definition of Cloud Computing" by Peter Mell and Tim Grance, dated Oct. 7, 2009[, which is cited in an IDS filed herewith, and a copy of which is attached thereto]

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being performed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processor unit 16, a system memory 28, and a bus 18 that couples various system components including system memory 28 to processor unit 16.

Processor unit 16 executes instructions for software that may be loaded into system memory 28. Processor unit 16 may be a number of processors, a multi-processor core, or some other type of processor, depending on the particular implementation. A number, as used herein with reference to an item, means one or more items. Further, processor unit 16 may be implemented using a number of heterogeneous processor systems in which a main processor is present with secondary processors on a single chip. As another illustrative example, processor unit 16 may be a symmetric multi-processor system containing multiple processors of the same type.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, data archival storage systems, etc.

Figure 2:
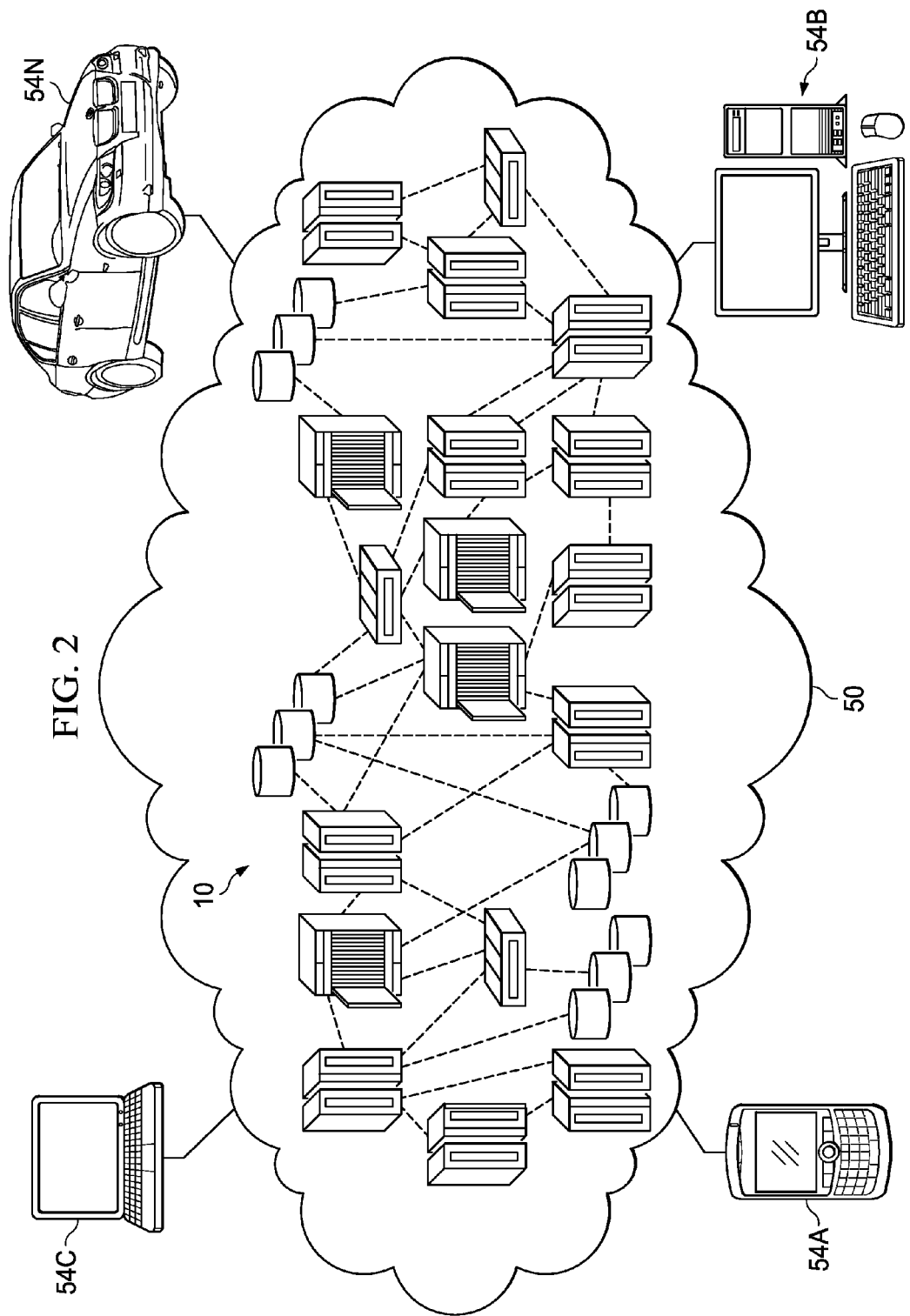
FIG. 2 depicts a cloud computing environment according to an illustration of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser). Program code located on one of nodes 10 may be stored on a computer recordable storage medium in one of nodes 10 and downloaded to a computing device within computing devices 54A-N over a network for use in these computing devices. For example, a server computer in computing nodes 10 may store program code on a computer readable storage medium on the server computer. The server computer may download the program code to a client computer in computing devices 54A-N for use on the client computer.

Figure 3:
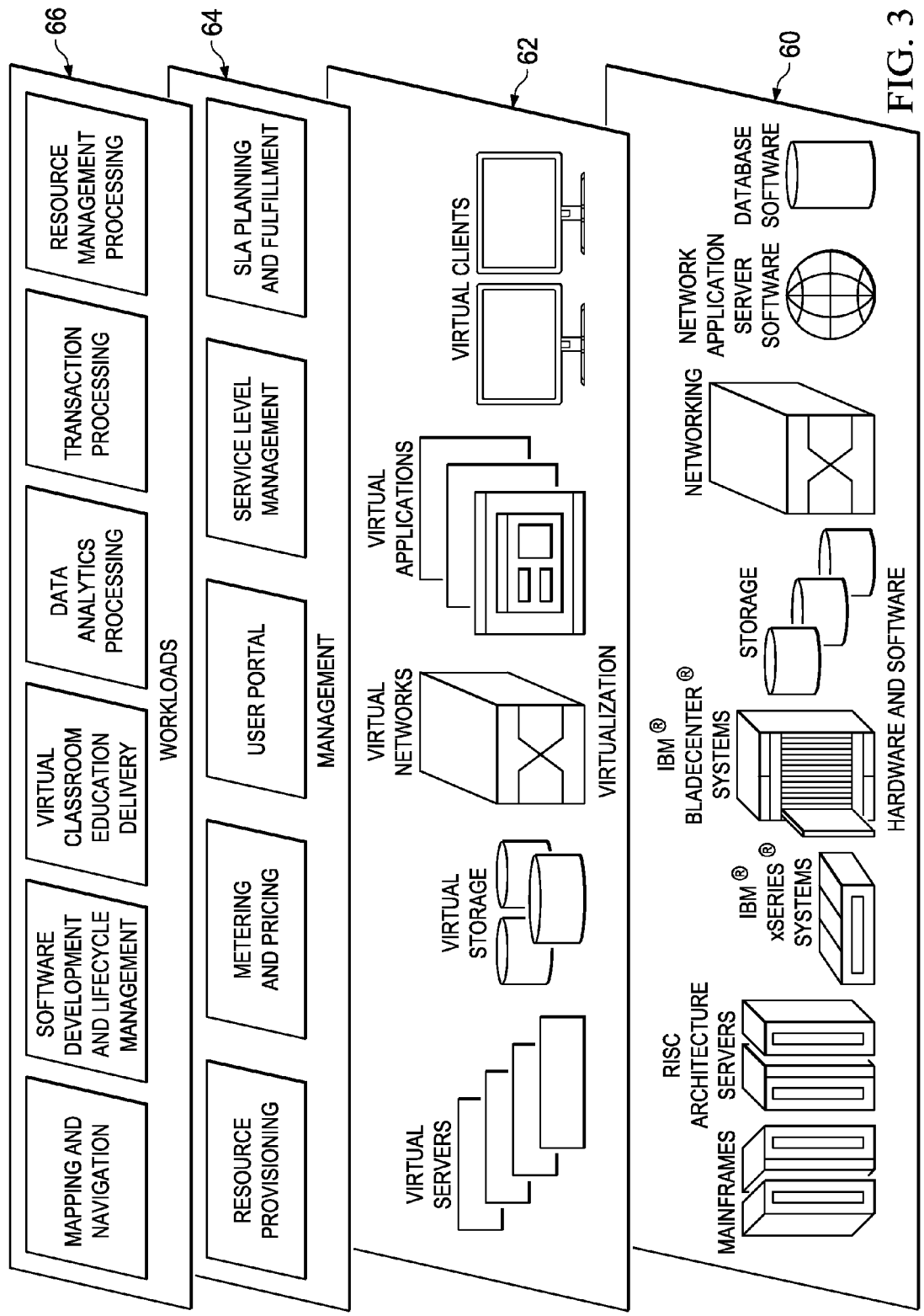
FIG. 3 depicts abstraction model layers according to an illustration of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources and are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and resource management processing.

The different illustrative embodiments recognize and take into account different considerations. For example, the different illustrative embodiments recognize and take into account that allocating resources efficiently in a cloud may be difficult in view of the different requests for those resources. Requests for resources in a cloud may be received using multiple attributes. A request may be received for a service. This service may be a computer having four gigabytes of memory, 50 gigabytes of disk space, and a processor speed of 2.0 gigahertz or greater. This type of request can be processed with currently-available allocation algorithms, such as a first fit or best fit allocation algorithm.

The different illustrative embodiments, however, recognize that processing requests for service is not always simple. For example, the different illustrative embodiments recognize that, in addition to requests having multiple parameters, these parameters may not be single values. Instead, the requests may come in a form of ranges. For example, a service request may include a request for about two gigabits to about five gigabits of memory, about 50 gigabytes to about 80 gigabytes of disk space, and a processor speed from about two gigahertz to about four gigahertz.

Further, the different illustrative embodiments recognize and take into account that even if the requests are specific values, these requests still must be matched up or mapped onto physical resources in the cloud. The different illustrative embodiments recognize that even with a virtual allocation of resources, limits are present to avoid over-committing resources that are available. The different illustrative embodiments recognize that the size, volume, and scale of requests for services to allocate computer resources increase the complexity in allocating those resources to meet various goals.

The different illustrative embodiments also recognize that when allocating resources to requests that have ranges, if only the minimum resources are allocated, the application using those resources may not have the desired performance. As a result, the organization or requester may be dissatisfied with the provider. If the maximum amount of resources is allocated, then an overuse of resources may occur. This situation may result in a satisfied customer. The provider, however, may not be able to service as many requests from different requestors with the same amount of resources in the cloud as compared to providing a lower level of resources.

Further, the different illustrative embodiments recognize and take into account that in many cases, although requests may have specific values or ranges of values, resources may not be allocated based on those specific values. For example, if a request comes in for four gigabytes of memory, 50 gigabytes of storage space, and a processor speed of two gigahertz, the allocation of resources may not be based on those specific values. Instead, many allocations of computing resources in a cloud may be based on templates. For example, one template may provide two gigabytes of memory, 40 gigabytes of storage space, and a two gigahertz processor speed. Another template may provide six gigabytes of memory, 60 gigabytes of storage space, and a processor speed of three gigahertz. As a result, the servicing of the request requires selecting between one of the two templates.

The different illustrative embodiments also recognize and take into account that requests for computing resources in a cloud may be received from multiple departments within an organization and/or multiple organizations. The different illustrative embodiments recognize and take into account that a system for automatically selecting and allocating computing resources may be desirable to process these requests. In other words, automated decision-making may be desirable for processing these requests. Further, the different illustrative embodiments recognize and take into account that different organizations and/or departments within an organization may have different business objectives that may need to be taken into account when processing these requests.

The different illustrative embodiments recognize and take into account that although the computing resources requested may be virtual, these resources are allocated from a physical pool of resources. In other words, these computing resources are not infinite in number for a cloud. Additionally, the different illustrative embodiments recognize and take into account that the requestor of computing resources may not control the cloud.

The different illustrative embodiments recognize these and other factors increase the difficulty in complexity in allocating computing resources in a cloud. This increase in difficulty also applies to other types of network data processing systems in addition to clouds. For example, these problems may be present in wide area networks, local area networks, intranets, and other types of networks.

Thus, the illustrative embodiments provide a method and apparatus for managing resources. In particular, the illustrative embodiments provide a method and apparatus that may be used to manage resources in a network data processing system. A request for resources in a network data processing system is received. The request comprises requested values for a plurality of attributes for resources in the network data processing system. In response to receiving the request, potential resources in the network data processing system are identified. The request is evaluated using a function configured to generate identified values for the plurality of attributes from the requested values in the request. These identified values are generated based on the cost for the plurality of attributes in the potential resources relative to an ideal allocation of the potential resources. The potential resources are allocated in the network data processing system using the identified values for the plurality of attributes.

Figure 4:
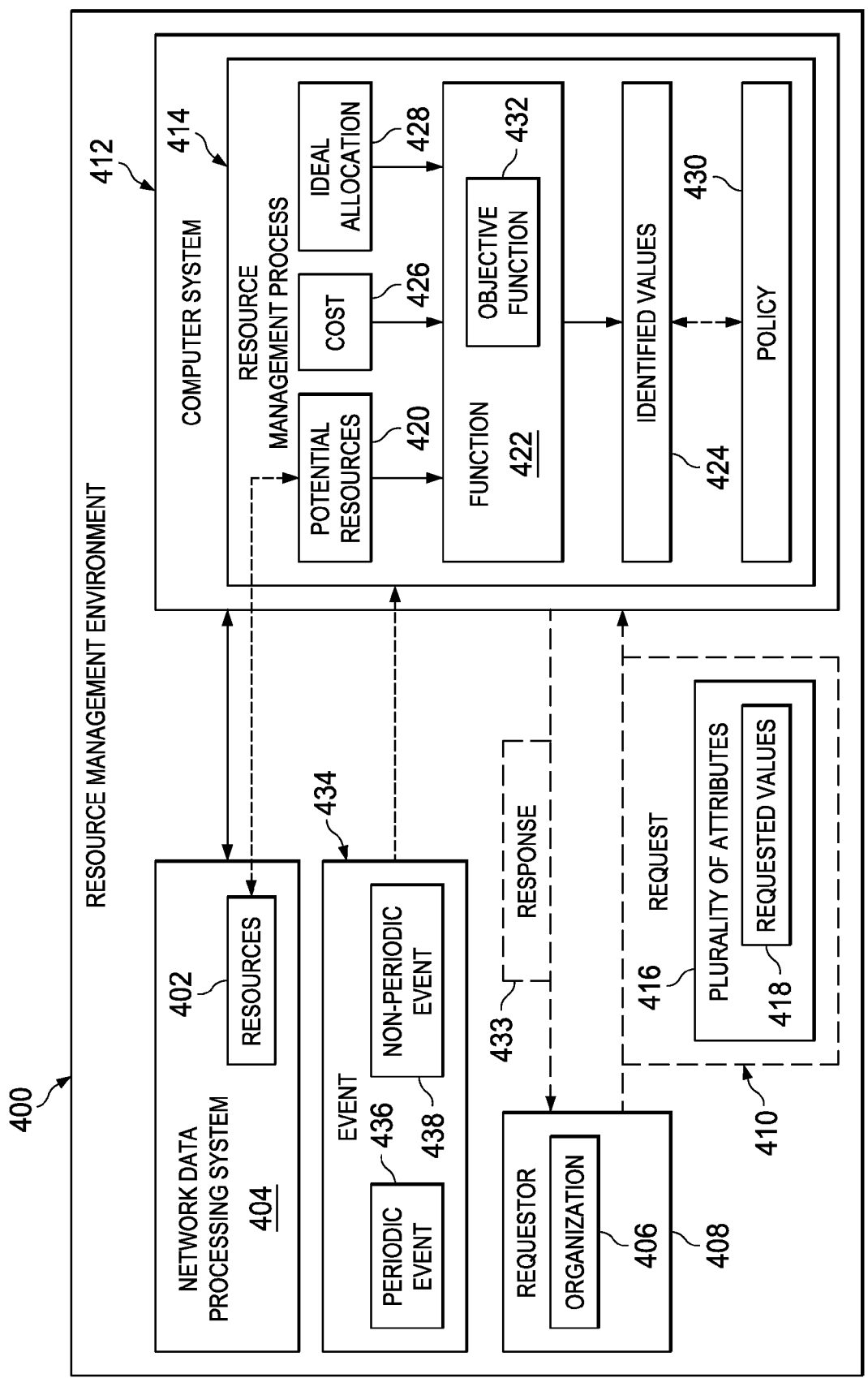
FIG. 4 is an illustration of a resource management environment in accordance with an illustrative embodiment.

With reference now to FIG. 4, an illustration of a resource management environment is depicted in accordance with an illustrative embodiment. Resource management environment 400 is an example of an environment used to manage resources 402. Resources 402 may take a number of different forms. In the illustrative examples, resources 402 take the form of network data processing system 404. In these illustrative examples, cloud computing environment 50 in FIG. 2 is an example of one implementation for network data processing system 404.

In these examples, network data processing system 404 may be, for example, without limitation, a local area network, a wide area network, a cloud, or some other suitable type of network data processing system. When network data processing system 404 takes the form of a cloud, the cloud may be selected from one of a public cloud, a private cloud, a hybrid cloud, or some other type of cloud.

In these illustrative examples, requestor 408 sends request 410 for resources in network data processing system 404. Requestor 408 takes the form of organization 406 in this illustrative example. Organization 406 may take a number of different forms. For example, organization 406 may be a business, a school, a government entity, a non-profit organization, or some other suitable type of organization.

Request 410 is received at computer system 412. Computer system 412 is a set of computers. A set, as used herein, with reference to items, means one or more items. For example, a set of computers is one or more computers. Further, the set of computers in computer system 412 may be implemented using computer system/server 12 in FIG. 1. Computer system 412 may be part of network data processing system 404 or may be separate from network data processing system 404.

In these depicted examples, resource management process 414 runs on computer system 412 and receives request 410 from organization 406. Resource management process 414 is an example of a process that may be used to provide resource management processing in workloads layer 66 in FIG. 3. In these illustrative examples, request 410 includes plurality of attributes 416 for resources 402. Plurality of attributes 416 includes attributes, such as, for example, without limitation, memory, storage, processor speed, bandwidth, availability, and other suitable types of attributes for resources 402 in network data processing system 404. In these examples, request 410 also includes requested values 418 for plurality of attributes 416. Each attribute in plurality of attributes 416 may have a single value or a range of acceptable values.

In response to receiving request 410, resource management process 414 identifies potential resources 420 in resources 402. Potential resources 420 are any resources within resources 402 that can be allocated. In other words, potential resources 420 may be resources not currently being used or reserved for other uses. Resource management process 414 evaluates request 410 using function 422. Additionally, potential resources 420 may vary or change over time. The change may occur as a result of resources being allocated, new resources being added, resources being removed for maintenance, resources lost because of hardware and/or software failures, and from other events that cause potential resources 420 to change.

In these examples, function 422 is configured to generate identified values 424 for plurality of attributes 416. Identified values 424 are generated for plurality of attributes 416 based on cost 426 for plurality of attributes 416 in potential resources 420 relative to ideal allocation 428 of potential resources 420. Identified values 424 are values closest to requested values 418 in request 410. This identification of identified values is made using potential resources 420 identified in network data processing system 404 and policy 430 for network data processing system 404.

A policy, in these examples, is a set of rules. Additionally, policy 430 also may include information used to apply the rules. In these illustrative examples, policy 430 may include a set of rules for making adjustments to function 422, making adjustments to an allocation of resources selected using function 422, and/or some combination of the two.

Policy 430 may include, for example, rules for prioritizing requests. For example, when network data processing system 404 takes the form of a cloud, policy 430 may include rules for processing particular types of requests or requests from selected requestors prior to processing other types of requests if the requests are received at around the same time. Policy 430 may include a set of rules for making adjustments to an allocation of resources based on business objectives. These business objectives may include, for example, without limitation, conservation of resources, levels of customer satisfaction, a financial budget, and/or other suitable types of business objectives.

Additionally, as one example, network data processing system 404 may take the form of a cloud being used by multiple organizations. In this example, policy 430 may include a set of rules for the types of resources that may be allocated to the different organizations. For example, if the set of rules may indicate that a greater number of resources may be allocated to one organization as compared to another organization, two organizations request the same types of resources.

In some illustrative examples, policy 430 may be used as part of a reservation system in which resources 402 in network data processing system 404 may be reserved using resource management process 414. Policy 430 may include a set of rules that identifies a priority for reservations from different organizations such that reservations with a higher priority receive the allocation of resources 402 before reservations with a lower priority.

Resource management process 414 allocates potential resources 420 in network data processing system 404 using identified values 424 for plurality of attributes 416. In these illustrative examples, resource management process 414 may also send response 433 to organization 406. Response 433 may include a notification of the resources allocated in network data processing system 404 for organization 406.

In these illustrative examples, function 422 may take a number of different forms. For example, without limitation, function 422 may be objective function 432. Objective function 432 is an optimization function in these examples. An optimization function is a function that selects or chooses the best elements from a set of possible alternatives. For example, objective function 432 may be used to maximize or minimize a mathematical function.

In other illustrative examples, function 422 may be, for example, a best-fit algorithm, a first-fit algorithm, or some other suitable type of function. As one illustrative example, function 432 may be a best fit algorithm that picks the allocation of resources that is geographically closest to requestor 408. As another illustrative example, function 432 may be a first-fit algorithm that selects the first available resources that have requested values 418 for plurality of attributes 416.

Additionally, resources management process 414 also may evaluate request 410 at a later time after allocating potential resources 420 from resources 402 for use by requestor 408. This evaluation may be performed in response to event 334. Event 334 may be, for example, periodic event 436 or non-periodic event 438.

Periodic event 436 may be the lapse of a timer, weekly, daily, monthly, or some other suitable type of periodic event. Non-periodic event 438 may take a number of different forms. For example, non-periodic event 438 may be a change in potential resources 420 available, a number of requests received by resource management process 414, a number of requests received within a period of time exceeding a threshold, or some other suitable type of event. In this manner, resource management process 414 is capable of re-evaluating request 410 to determine whether changes to the allocation of resources allocated to requestor 408 should occur. For example, this type of re-evaluation may be made in response to changes that may affect the service level requested or desired by requestor 408.

The illustration of resource management environment 400 is not meant to imply physical or architectural limitations to the manner in which different illustrative embodiments may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, in other illustrative embodiments, resource management environment 400 may be applied to manage resources 402 in other forms other than network data processing system 404. For example, resources 402 may be used to allocate resources in the form of bandwidth for internet connections, hotel rooms in a hotel, and other suitable types of resources.

Additionally, resource management process 414 may be used to manage resources for multiple network data processing systems or even different types of resources. For example, resource management process 414 may be used to provide management of resources 402 in network data processing system 404 as well as in a hotel.

Additionally, computer system 412, in these examples, may be part of the same organization that provides resources 402. In other illustrative examples, computer system 412 may be located at a third party location or consulting organization separate from the organization that provides resources 402 to organization 406.

Figure 5:
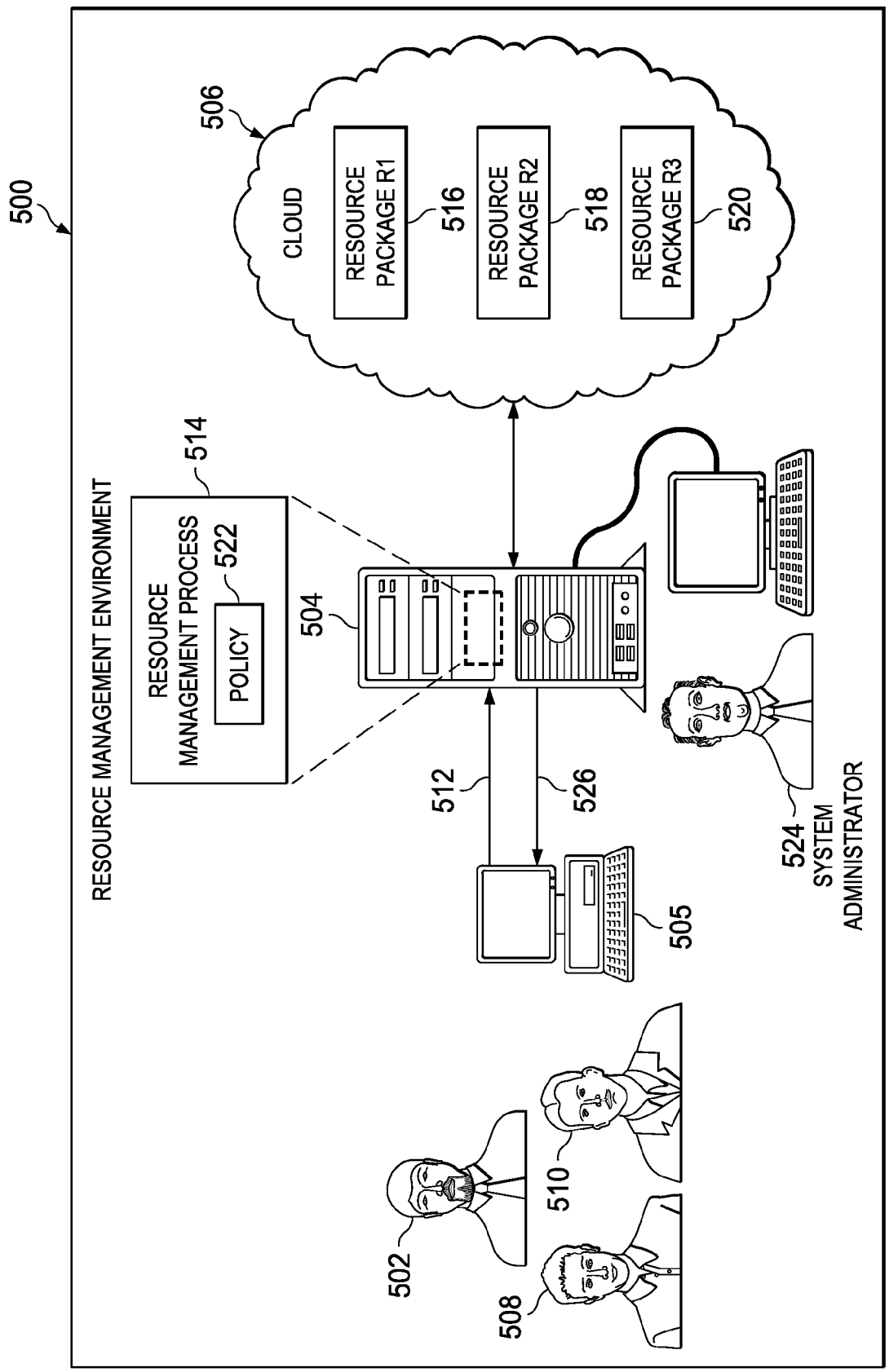
FIG. 5 is an illustration of a resource management environment in accordance with an illustrative embodiment.

With reference now to FIG. 5, an illustration of a resource management environment is depicted in accordance with an illustrative embodiment. In this illustrative example, resource management environment 500 is an example of one implementation for resource management environment 400 in FIG. 4.

As depicted, resource management environment 500 includes requestors 502, computer system 504, and cloud 506. Requestors 502 take the form of customers 508 in this illustrative example. Each of customers 508 may send service requests to computer system 504 for resources available from cloud 506. Cloud 506 is an example of one implementation for network data processing system 404 in FIG. 4. Computer system 504 is part of cloud 506 in this depicted example.

As one illustrative example, customer 510 sends request 512 to computer system 504 using computer system 505. Request 512 identifies a plurality of attributes for the resources being requested and requested values for the plurality of attributes. For example, request 512 identifies attributes, such as processor speed, disk space, and memory. Request 512 also identifies a requested range of values for each attribute. The request range of values for processor speed is about one gigahertz to about two gigahertz. The requested range of values for disk space is about 200 megabytes to about 300 megabytes. The requested range of values for memory is about two gigabytes to about four gigabytes.

Resource management process 514 running on computer system 504 receives request 512 sent by customer 510. Resource management process 514 identifies potential resources in cloud 506 that will satisfy request 512. For example, resource management process 514 identifies resource package R1 516, resource package R2 518, and resource package R3 520. Each of these resource packages is a pre-defined template for an allocation of resources. In particular, each of these resource packages is a standard virtual server template used in cloud 506. Further, these resource packages are the potential allocations of resources in cloud 506 to be allocated to customer 510.

In this illustrative example, resource management process 514 uses an objective function, such as objective function 432 in FIG. 4, to determine which allocation of resources in cloud 506 to provide to customer 510. The objective function makes this determination based on policy 522. Policy 522 may be managed by system administrator 524, in these examples.

In this illustrative example, policy 522 includes proximity scores and resource weights for each of the plurality of attributes for the resource packages. For example, policy 522 may include tables, graphs, a database, and/or functions that identify the proximity scores. The proximity scores identify how close a particular allocation of a resource is to an ideal allocation of the resource. The resource weight is a number based on a number of factors including, for example, cost, priority of the attribute, importance of the attribute, and/or some other suitable factors. In this illustrative example, the resource weights for the attributes are the importance of each attribute relative to each other. For the attributes of processor speed, disk space, and memory, the resource weights are 5, 1, and 2, respectively. The proximity scores and resource weights may be adjusted by system administrator 524.

In this illustrative example, the objective function is:

$$f(R) = \sum_{i=1}^{n} P_i * W_i \qquad (1)$$

where f(R) is the objective function, R is the resource package, i is the attribute, n is the total number of attributes, $P_i$ is the proximity score of the attribute, and $W_i$ is the resource weight of the attribute. This objective function is an example of one implementation for objective function 432 in FIG. 4.

Evaluating the objective function for each of the resource packages gives:

$f(R1)=100*5+70*1+80*2=730$ $f(R2)=100*5+100*1+60*2=720$ $f(R3)=70*5+100*1+85*2=620$

Resource management process 514 selects the resource package with the smallest solution for the objective function. In other words, resource management process 514 selects resource package R3 520 to allocate to customer 510. Resource management process 514 sends response 526 to customer 510 identifying resource package R3 520 as the selected allocation of resources in cloud 506.

In this illustrative example, resource management process 514 may re-evaluate the allocation of resources for customer 510 in response to an event occurring. The event may be a periodic event or a non-periodic event. For example, a periodic event may be the lapse of a timer. A non-periodic event may be, for example, a change in the potential resources available.

Figure 6:
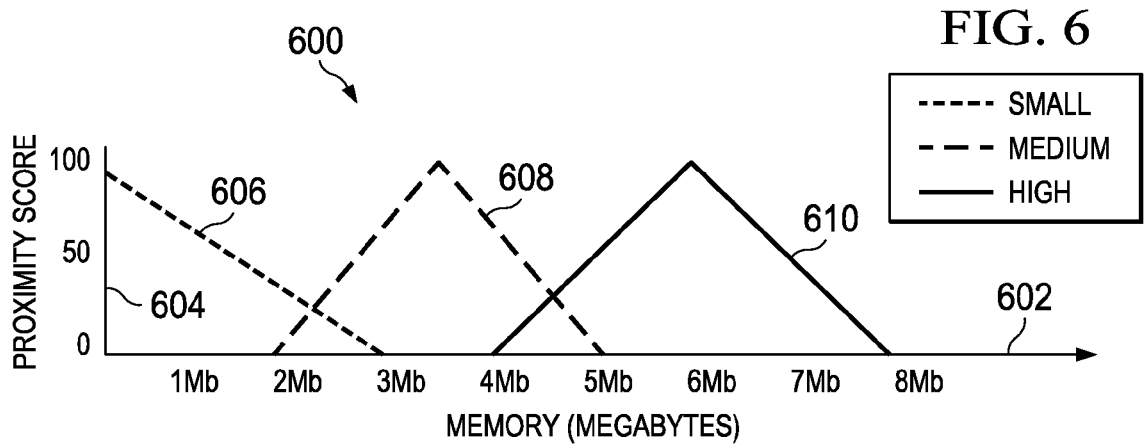
FIG. 6 is a diagram illustrating proximity scores for an attribute in accordance with an illustrative embodiment.

With reference now to FIG. 6, a diagram illustrating proximity scores for an attribute is depicted in accordance with an illustrative embodiment. In this illustrative example, graph 600 is an example of a graph in policy 524 in FIG. 5 that may be used to identify the proximity scores for the different attributes for the resource packages. As depicted, graph 600 identifies proximity scores for memory. In this illustrative example, the proximity scores identified in graph 600 for memory are based on the cost of memory.

In this illustrative example, x-axis 602 represents memory in megabytes, while y-axis 604 represents a proximity score on a scale of zero to 100. A score of 100 represents the best score or optimal allocation, while zero represents the lowest score or least desirable allocation.

In this example, three types of computers or virtual computers can be allocated. These types of computers are identified as small, medium, and large. Of course, any number of categories may be used. In these examples, line 606 represents the memory that may be allocated to a small computer, line 608 represents the memory that can be allocated to a medium computer, and line 610 represents the memory that can be allocated to a large computer.

The memory range for a small computer, as indicated by line 606, is up to three megabytes. The memory range that can be allocated to a medium computer is two megabytes to five megabytes. The memory range for a large computer is four megabytes to eight megabytes. In these examples, the optimal allocation of memory for a medium computer is 3.5 megabytes, while the optimal allocation for a large computer is six megabytes. The optimal allocation for a small computer is half a megabyte.

In this example, if a request is received for three megabytes of memory, the resource management process allocates a medium computer instead of a small computer based on the score. The score for the small computer is zero, while the score for the medium computer is about 75. In this example, a medium computer has a higher score because of the cost to provide three megabytes of memory in a medium computer as compared to a small computer.

This illustration may be applied to identifying proximity scores for other attributes. For example, a graph similar to graph 600 may be used to identify proximity scores for the attributes of disk space, processor speed, and/or other attributes. The illustration of graph 600 is presented as one example of a manner in which proximity scores may be identified in a policy.

Further, the proximity scores that are identified using graph 600 may be adjusted by a system administrator before being used in an objective function. In some illustrative examples, a system administrator may make changes to the proximity scores identified for memory in graph 600 based on changes in the cost of memory.

Figure 7:
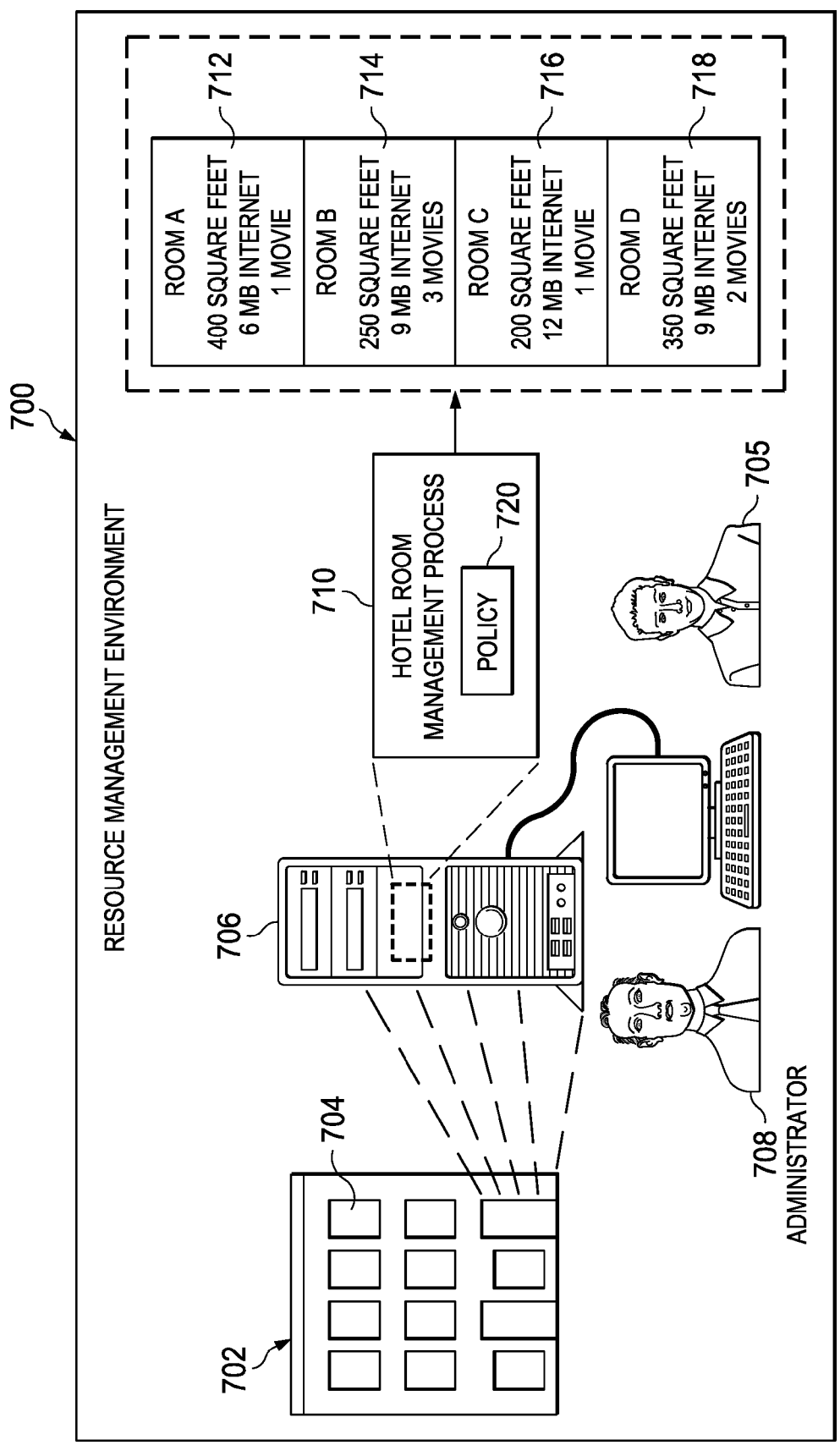
FIG. 7 is an illustration of a resource management environment in accordance with an illustrative embodiment.

With reference now to FIG. 7, an illustration of a resource management environment is depicted in accordance with an illustrative embodiment. In this illustrative example, resource management environment 700 is an example of one implementation for resource management environment 400 in FIG. 4. As depicted, resource management environment 700 includes hotel 702. Hotel 702 includes hotel rooms 704. Hotel rooms 704 are an example of one implementation for resources 402 in FIG. 4.

In this illustrative example, customer 705 may request a room in hotel 702 having a plurality of attributes and requested values for the plurality of attributes. In particular, customer 705 requests a room in hotel 702 having a square footage of about 200 square feet to about 400 square feet, an internet connection with a speed of about 6 megabits per second to about 12 megabits per second, and a television with 1 to 3 free movies. The optimal square footage is about 270 square feet. The optimal speed for the internet connection is about 9 megabits per second. The optimal number of free movies is 2 movies.

In this depicted example, the request of the customer is input into computer system 706 in hotel 702 by administrator 708. Hotel room management process 710 running on computer system 606 receives the request and identifies room A 612, room B 714, room C 716, and room D 718 as potential rooms for customer 705. The potential rooms are the rooms that satisfy the requested values for the different attributes. These potential rooms are not the actual rooms in hotel rooms 704 in hotel 702. These potential rooms are the types of rooms in hotel rooms 704 that are available. More than one room of a particular type may available to the customer.

The prices for the potential rooms are all substantially the same. In particular, the price for each of the potential rooms is $150.00 per night. The operating costs associated with each of the potential rooms for hotel 702 are not the same for each of the potential rooms. The operating costs associated with the potential rooms are based on the square footage, the time during which the internet connection is used, and the number of free movies watched. These operating costs are also different because hotel 702 contracts with other service providers to provide the internet connection and free movies to customers.

Room A 712 provides about 400 square feet, a speed of about 6 megabytes for the internet connection, and 1 free movie. Room B 714 provides about 250 square feet, a speed of about 9 megabytes for the internet connection, and 3 free movies. Room C 716 provides about 200 square feet, a speed of about 12 megabytes for the internet connection, and 1 free movie. Room D 718 provides about 350 square feet, a speed of about 9 megabytes for the internet connection, and 2 free movies.

The proximity scores for the attributes of these potential rooms are identified by calculating the absolute value of the difference between the value for the attribute and the optimal value for the attribute. In this illustrative example, the resource weights for the attributes are based on the cost of the square footage, internet connection, and movies. The cost of 1 movie, 50 square feet, or 3 megabytes per second over the optimal values is $10.00.

Each of the potential rooms has square footage, speed of internet connection, and movies. Solving the objective function in the form of equation 1, as described above, for each of the potential rooms gives:

$$f(A) = |(270-400)|*(\$10*2.6) + |(9-6)|*(\$10*-1) + |(2-1)|*(\$10*-1)$$
$$= 130*26 + 3*-10 + 1*-10 = 3380 - 30 - 10 = 3340$$

$$f(B) = |(270-250)|*(\$10*-.4) + |(9-9)|*(\$10*0) + |(2-3)|*(\$10*1)$$
$$= 20*-4 + 0*0 + 1*10 = -80 + 0 + 10 = -70$$

$$f(C) = |(270-200)|*(\$10*-1.4) + |(9-12)|*(\$10*1) + |(2-1)|*(\$10*-1)$$
$$= 70*-14 + 3*10 + 1*-10 = -980 + 30 - 10 = -960$$

$$f(D) = |(270-350)|*(\$10*1.6) + |(9-9)|*(\$10*0) + |(2-2)|*(\$10*0)$$
$$= 80*16 + 0*0 + 0*0 = 1280 + 0 + 0 = 1280.$$

Based on these solutions for the objective function, hotel management process 710 selects room C 716 for customer 705. Room C 716 has the smallest solution for the objective function.

In other illustrative examples, hotel 702 may use policy 720 to select a room for customer 705. Policy 720 may include rules for customer satisfaction. Administrator 708 may make adjustments to the objective function to take into account customer satisfaction. In some illustrative examples, administrator 708 may change the objective function and/or policy 720 to take into account changing costs.

In this illustrative example, computer system 706 is located in hotel 702. However, in other illustrative examples, computer system 706 may be located at a central site and connected to a network for a chain of hotels. In still other illustrative examples, customer 705 may generate the request for a room on a website.

Figure 8:
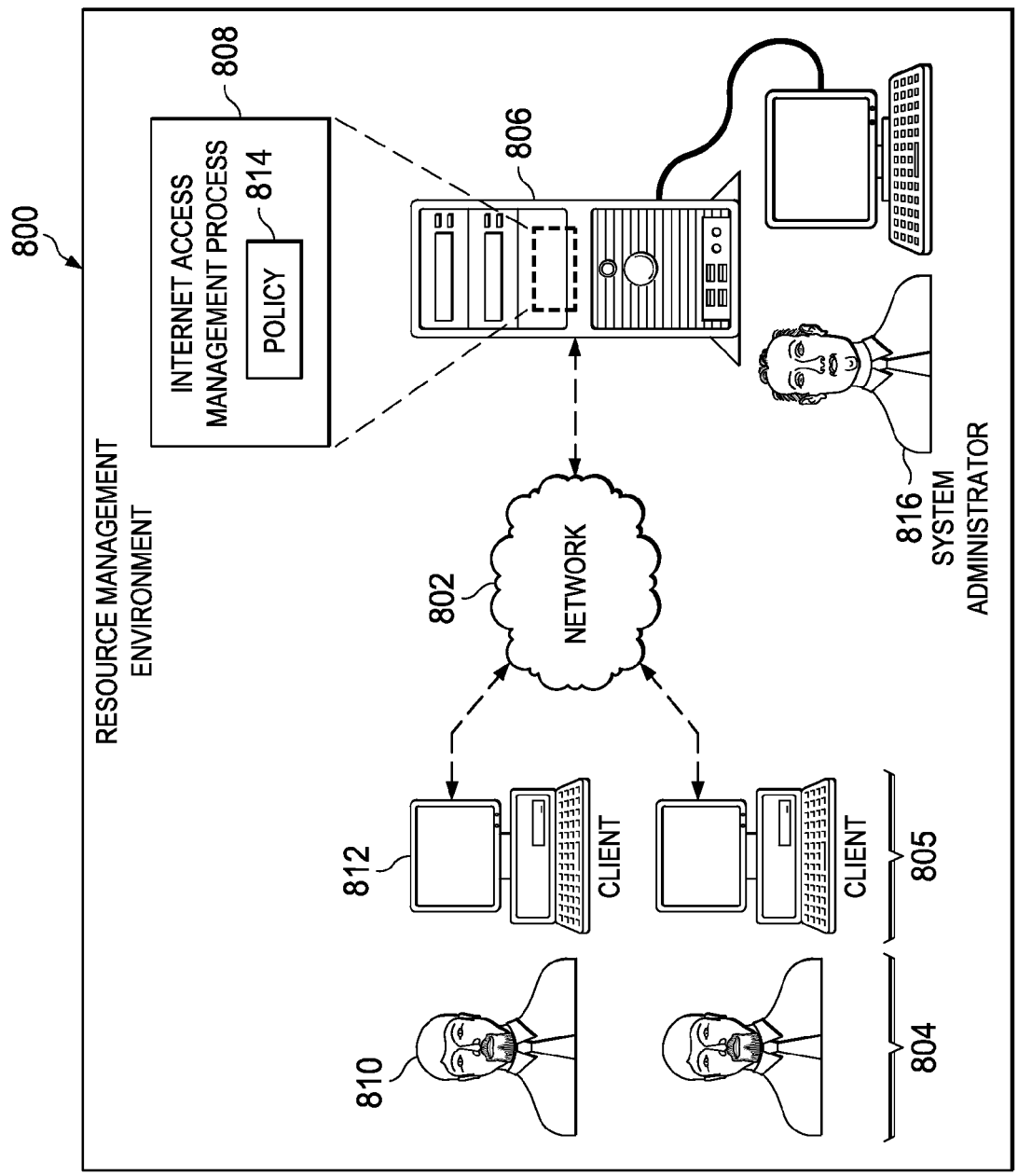
FIG. 8 is an illustration of a resource management environment in accordance with an illustrative embodiment.

With reference now to FIG. 8, an illustration of a resource management environment is depicted in accordance with an illustrative embodiment. In this illustrative example, resource management environment 800 is an example of one implementation for resource management environment 400 in FIG. 4. As depicted, resource management environment 800 includes network 802. Network 802 is an internet-based network in this illustrative example. Network 802 is an example of one implementation for resources 402 in FIG. 4.

Users 804 use client computers 805 connected to network 802. Users 804 send requests for access to resources in network 802 using network 802. These requests are received by internet access management process 808 running on computer system 806. Computer system 806 is also connected to network 802.

For example, user 810 at client computer 812 may send a request for access to network 802 with a particular bandwidth and a particular amount of online storage space. The bandwidth is selected to provide a particular upload and download speed. The amount of online storage space may be for user 810 to store photos, video clips, music, and/or other files. For example, user 810 may request a 1 megabit per second upload speed, a 3 megabit per second download speed, and 1 gigabyte of online storage space.

Internet access management process 808 uses an objective function, such as objective function 432 in FIG. 4, to select an allocation of resources in network 802 to satisfy the request of user 810. As one illustrative example, internet access management process 808 identifies internet access packages that may be allocated for user 810. These internet access packages may each have a specified bandwidth and specified amount of online storage space.

Internet access management process 808 uses the objective function to determine which internet access package is the best allocation of resources for user 810. Additionally, internet access management process 808 may use policy 814 to select the allocation of resources for user 810. Policy 814 may be adjusted by system administrator 816 as more and more requests by users 804 are processed.

Figure 9:
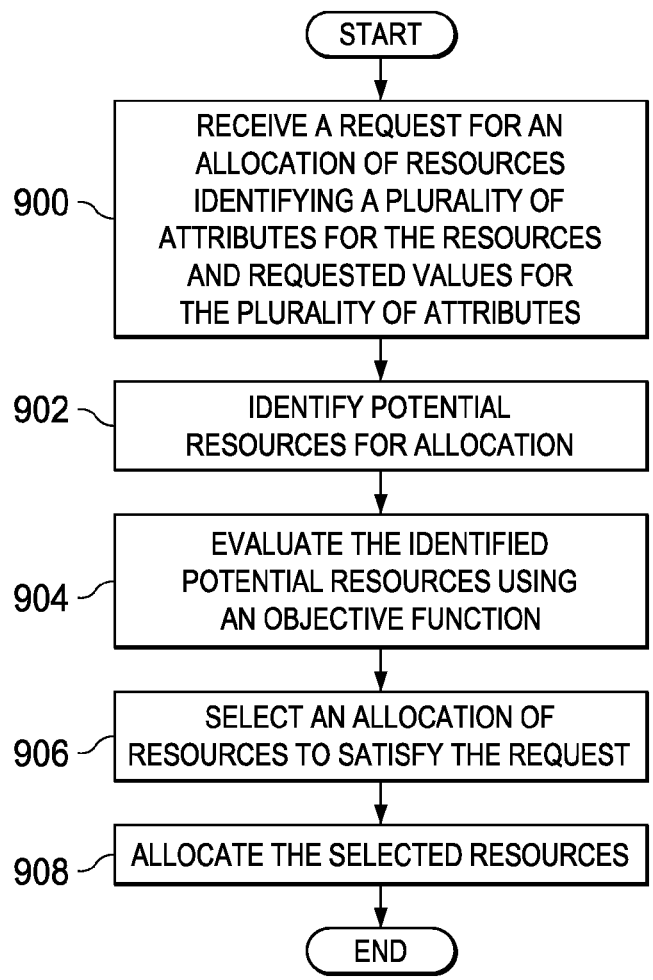
FIG. 9 is an illustration of a flowchart of a process for managing resources in accordance with an illustrative embodiment.

With reference now to FIG. 9, an illustration of a flowchart of a process for managing resources is depicted in accordance with an illustrative embodiment. The process illustrated in FIG. 9 may be implemented in a resource management environment, such as resource management environment 400 in FIG. 4. In particular, this process may be implemented using resource management process 414 in FIG. 4.

The process begins by receiving a request for an allocation of resources identifying a plurality of attributes for the resources and requested values for the plurality of attributes (step 900). The requested values may be particular values or a range of values. In some illustrative examples, the requested value for an attribute may be an identification of category or type.

The process then identifies potential resources for allocation (step 902). The potential resources are any resources that are available for allocation to satisfy a request. These resources may change based on changes in the resources being used, the number of requests waiting to be processed, and/or other factors. Thereafter, the process evaluates the identified potential resources using an objective function (step 904). In step 904, the objective function is solved using at least one of a policy, proximity scores for the attributes of the potential resources, and resource weights for the attributes. The proximity scores indicate how close the attributes for a potential resource are to an ideal allocation. The resource weights are numbers based on the cost and/or importance of the attributes for the potential resource.

The process selects an allocation of resources to satisfy the request (step 906). The allocation may be selected as the allocation of resources having the optimal solution for the objective function. In this illustrative example, the optimal solution is the smallest solution or the minimum value of the identified values. In other illustrative examples, the optimal solution may be the largest solution. Thereafter, the process allocates the selected resources (step 908), with the process terminating thereafter.

Figure 10:
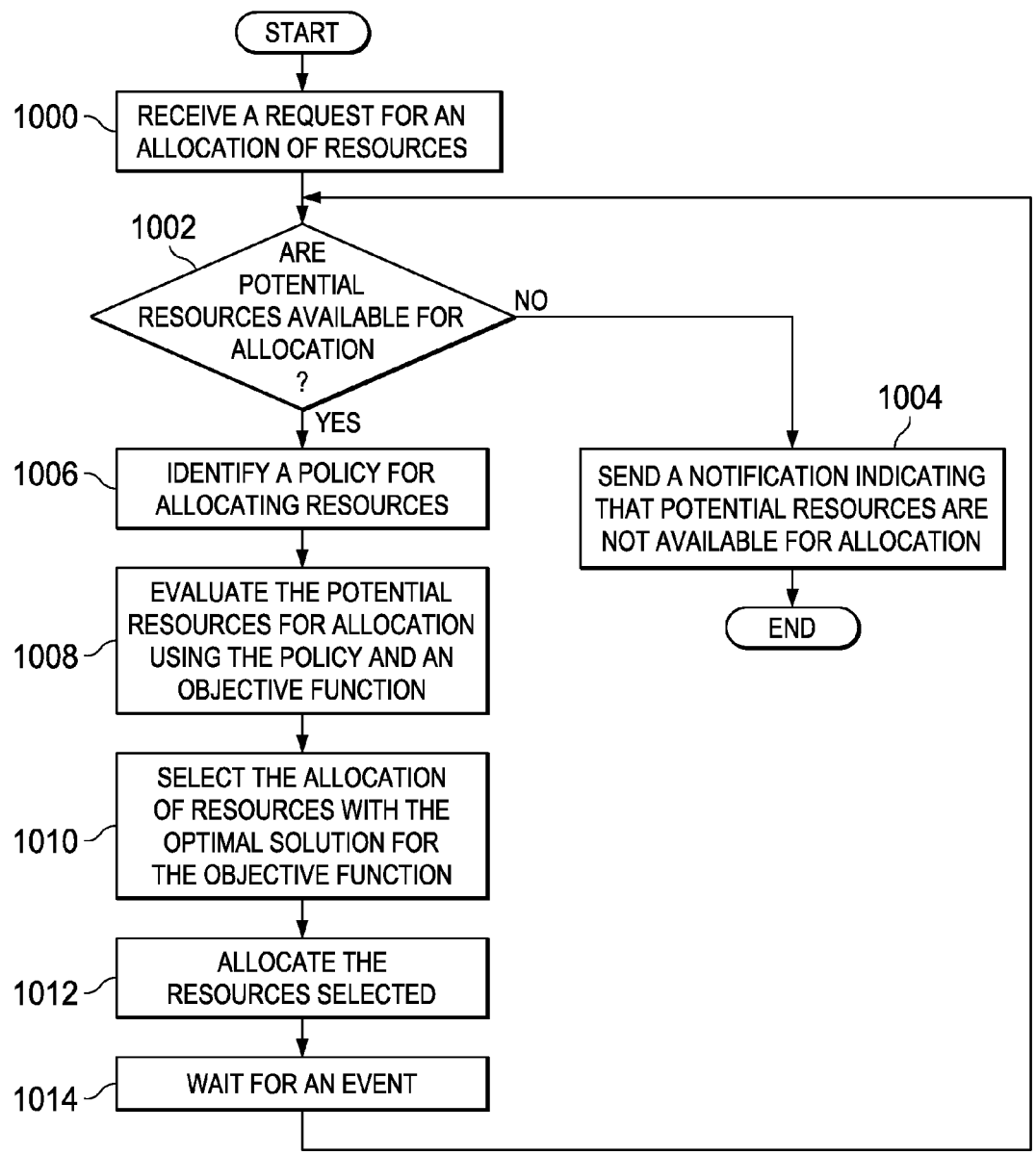
FIG. 10 is an illustration of a flowchart of a process for managing resources in accordance with an illustrative embodiment.

With reference now to FIG. 10, an illustration of a flowchart of a process for managing resources is depicted in accordance with an illustrative embodiment. The process illustrated in FIG. 10 may be implemented in a resource management environment, such as resource management environment 400 in FIG. 4. In particular, this process may be implemented using resource management process 414 in FIG. 4.

The process begins by receiving a request for an allocation of resources (step 1000). The request identifies a plurality of attributes for the resources and requested values for the plurality of attributes. The process then determines whether potential resources are available for allocation (step 1002). If potential resources are not available for allocation, the process sends a notification indicating that potential resources are not available for allocation (step 1004), with the process terminating thereafter.

With reference again to step 1002, if potential resources are available for allocation, the process identifies a policy for allocating resources (step 1006). The policy may include at least one of proximity scores for the plurality of attributes, resource weights for the attributes, cost of the potential resources relative to the ideal allocation, business rules, regulations, an identification of customer service levels, an identification of customer satisfaction levels, and other suitable information.

Thereafter, the process evaluates the potential resources for allocation using the policy and an objective function (step 1008). The objective function generates identified values for the potential resources relative to the ideal allocation. In this illustrative example, the objective function may be solved to generate an identified value for each potential allocation of resources.

Thereafter, the process selects the allocation of resources with the optimal solution for the objective function (step 1010). In this illustrative example, the optimal solution is the smallest solution or the minimum value of the identified values. In other illustrative examples, the optimal solution may be the largest solution.

The process then allocates the resources selected (step 1012). Next, the process waits for an event (step 1014). The event may be a periodic event or a non-periodic event. The periodic event may be the lapse of a timer, weekly, daily, monthly, or some other suitable type of periodic event. The non-periodic event may take a number of different forms. For example, the non-periodic event may be a change in the potential resources available, a number of requests received by the process, a number of requests received within a period of time exceeding a threshold, or some other suitable type of non-periodic event.

In response to an event occurring, the process returns to step 1002 as described above. In this manner, the process is able to reevaluate the request to determine whether changes to the allocation of resources should be made.

Figure 11:
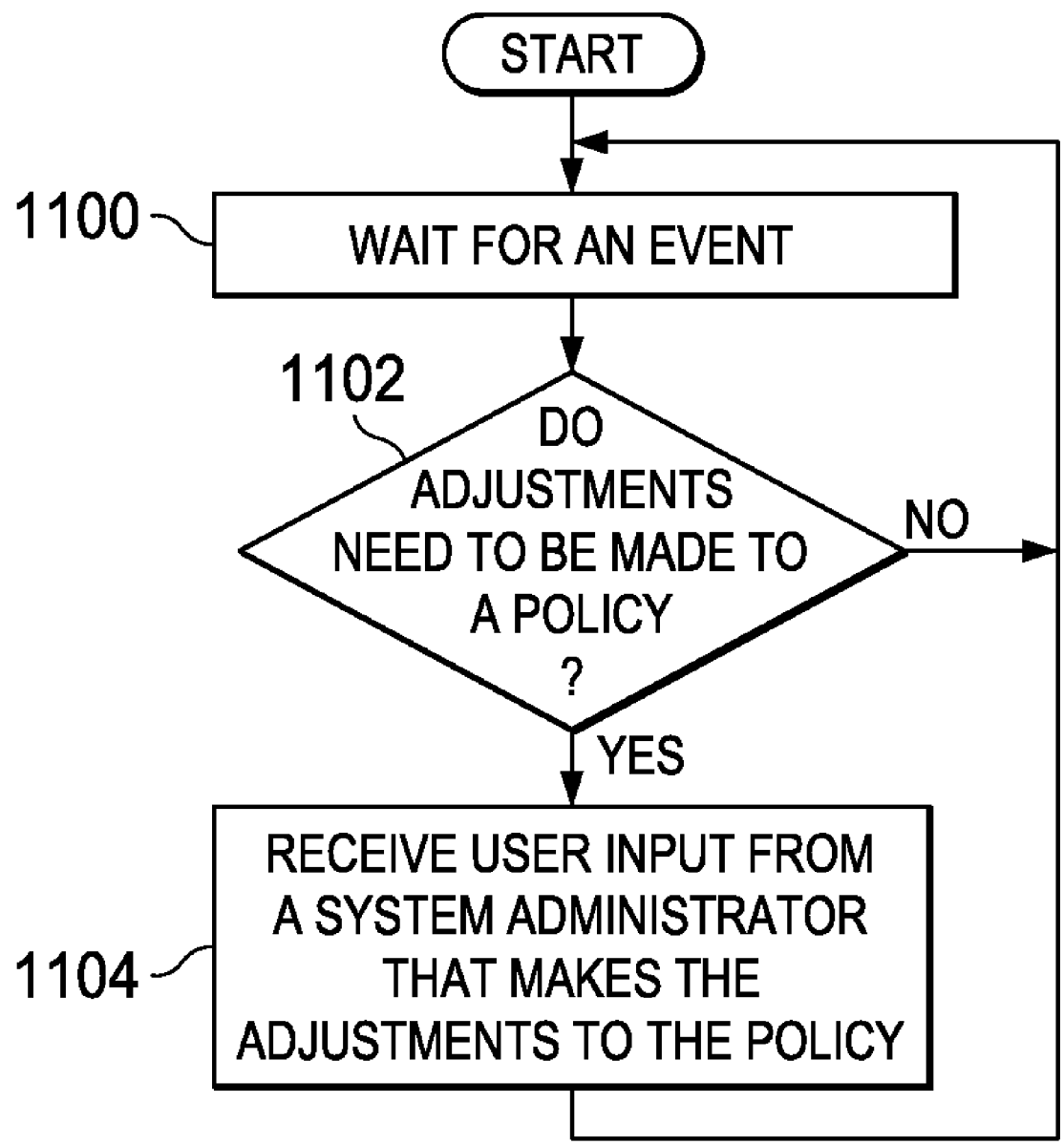
FIG. 11 is an illustration of a flowchart of a process for making adjustments to a policy in accordance with an illustrative embodiment.

With reference now to FIG. 11, an illustration of a flowchart of a process for making adjustments to a policy is depicted in accordance with an illustrative embodiment. The process illustrated in FIG. 11 may be performed using, for example, computer system 412 in FIG. 4 to make changes to policy 430 in FIG. 4.

The process begins by waiting for an event (step 1100). The event may be, for example, a period of time, changes in the number of resources available, changes in business rules, changes in the cost of resources, changes in the level of customer satisfaction provided, changes in guidelines for conserving resources, or some other suitable type of event.

The process determines whether adjustments need to be made to a policy (step 1102). Adjustments to a policy may include, for example, without limitation, changing the proximity scores for the attributes of resources that may be identified in a table and/or graph, changing resource weights based on changing costs of resources, adding terms or values to the objective function, and/or other suitable types of adjustments. In step 1102, this determination may be made by prompting a system administrator to make adjustments to the policy.

If adjustments do not need to be made to the policy, the process returns to step 1100 as described above. Otherwise, if adjustments need to be made to the policy, the process receives user input from a system administrator that makes the adjustments to the policy (step 1104). The process then returns to step 1100 as described above.

In some illustrative examples, the process illustrated in FIG. 11 may be implemented between steps 1006 and 1008 in FIG. 10. In these illustrative examples, the event waited for in step 1100 is the identification of the policy in step 1006 in FIG. 10.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction system. For the purposes of this description, a computer-usable or computer readable medium can be any tangible apparatus that can contain, store, communicate, propagate, or transport the program for use by or in connection with the instruction system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual running of the program code, bulk storage, and cache memories which provide temporary storage of at least some program code in order to reduce the number of times code must be retrieved from bulk storage during running of the code.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A data processing system comprising:
   a bus;
   a communications unit connected to the bus;
   a storage device connected to the bus, wherein the storage device includes program code; and
   a processor unit connected to the bus, wherein the processor unit runs the program code to receive a request for resources in a network data processing system, wherein the request comprises requested values for a plurality of attributes for the resources in the network data processing system; identify potential resources in the network data processing system in response to receiving the request; and evaluate the request using a function configured to generate identified values for the plurality of attributes from the requested values in the request based on proximity scores for the plurality of attributes in the potential resources relative to an ideal allocation of the potential resources and resource weights for the plurality of attributes in the potential resources.

2. A computer program product for managing resources, the method comprising:
   a non-transitory computer recordable storage medium;
   program code, stored on the non-transitory computer recordable storage medium, for receiving a request for the resources in a network data processing system, wherein the request comprises requested values for a plurality of attributes for the resources in the network data processing system;
   program code, stored on the non-transitory computer recordable storage medium, for identifying potential resources in the network data processing system in response to receiving the request; and
   program code, stored on the non-transitory computer recordable storage medium, for evaluating the request using a function configured to generate identified values for the plurality of attributes from the requested values in the request based on proximity scores for the plurality of attributes in the potential resources relative to an ideal allocation of the potential resources and resource weights for the plurality of attributes in the potential resources.

3. The computer program product of claim 2 further comprising:
   program code, stored on the non-transitory computer recordable storage medium, for allocating the potential resources in the network data processing system using the identified values for the plurality of attributes to form an allocation of the potential resources.

4. The computer program product of claim 3 further comprising:

program code, stored on the non-transitory computer recordable storage medium, for performing the evaluating step in response to an event to generate updated values for the plurality of attributes.

5. The computer program product of claim 4, wherein the event is a periodic event.

6. The computer program product of claim 4 further comprising:

program code, stored on the non-transitory computer recordable storage medium, for selectively changing the allocation of the potential resources using the updated values after allocating the potential resources using the identified values.

7. The computer program product of claim 2, wherein a range of acceptable values is present for the plurality of attributes and wherein the potential resources change over time.

8. The computer program product of claim 2, wherein the program code, stored on the non-transitory computer recordable storage medium, for evaluating the request using the function comprises:

program code, stored on the non-transitory computer recordable storage medium, for evaluating the request using the function configured to generate the identified values for the plurality of attributes from the requested values in the request based on the proximity scores for the plurality of attributes in the potential resources relative to the ideal allocation of the potential resources, the resource weights for the plurality of attributes in the potential resources, and a policy for the network data processing system.

9. The computer program product of claim 2, wherein the program code, stored on the non-transitory computer recordable storage medium, for evaluating the request using the function comprises:

program code, stored on the non-transitory computer recordable storage medium, for finding one of a minimum solution and a maximum solution for the function from a set of solutions for the function, wherein the function multiplies a resource weight with a proximity score for each of the plurality of attributes to form a plurality of results and sums the plurality of results to generate a solution for the function.

10. The computer program product of claim 9, wherein the function is an objective function and wherein the objective function comprises:

$$f(R) = \sum_{i=1}^{n} P_i * W_i,$$

wherein f(R) is the objective function, R is a resource package, $P_i$ is the proximity score, $W_i$ is the resource weight, i is the each of the plurality of attributes, and n is a total number for the plurality of attributes.

11. The computer program product of claim 2, wherein the program code is stored on the non-transitory computer recordable storage medium in a data processing system, and wherein the program code is downloaded over a network from a remote data processing system to the data processing system.

12. The computer program product of claim 2, wherein the program code is stored on the non-transitory computer recordable storage medium in a server data processing system, and wherein the program code is downloaded over a network to a remote data processing system for use in a second non-transitory computer readable storage medium with the remote data processing system.

13. The data processing system of claim 1, wherein the processor runs the program code to allocate the potential resources in the network data processing system using the identified values for the plurality of attributes to form an allocation of the potential resources.

14. The data processing system of claim 13, wherein the processor runs the program code to perform the evaluating step in response to an event to generate updated values for the plurality of attributes.

15. The data processing system of claim 14, wherein the event is a periodic event.

16. The data processing system of claim 14 wherein the processor runs the program code to selectively change the allocation of the potential resources using the updated values after allocating the potential resources using the identified values.

17. The data processing system of claim 1, wherein a range of acceptable values is present for the plurality of attributes and wherein the potential resources change over time.

18. The data processing system of claim 1, wherein the program code to evaluate the request using the function comprises:

program code to evaluate the request using the function configured to generate the identified values for the plurality of attributes from the requested values in the request based on the proximity scores for the plurality of attributes in the potential resources relative to the ideal allocation of the potential resources, the resource weights for the plurality of attributes in the potential resources, and a policy for the network data processing system.

19. The data processing system of claim 1, wherein the program code to evaluate the request using the function comprises:

program code to find one of a minimum solution and a maximum solution for the function from a set of solutions for the function, wherein the function multiplies a resource weight with a proximity score for each of the plurality of attributes to form a plurality of results and sums the plurality of results to generate a solution for the function.

20. The data processing system of claim 19, wherein the function is an objective function and wherein the objective function comprises:

$$f(R) = \sum_{i=1}^{n} P_i * W_i,$$

wherein f(R) is the objective function, R is a resource package, $P_i$ is the proximity score, $W_i$ is the resource weight, i is the each of the plurality of attributes, and n is a total number for the plurality of attributes.

* * * * *